United States Patent [19]
Herrington et al.

[11] 3,957,627
[45] May 18, 1976

[54] HYDROTREATING HYDROCARBON FEEDS USING AMPHORA-SHAPED CATALYSTS

[75] Inventors: Daniel R. Herrington, Bedford Heights; Albert P. Schwerko, Solon, both of Ohio

[73] Assignee: The Standard Oil Company (Ohio), Cleveland, Ohio

[22] Filed: Feb. 18, 1975

[21] Appl. No.: 550,251

[52] U.S. Cl. ............................ 208/216; 208/217
[51] Int. Cl.² ........................................ C10G 23/02
[58] Field of Search ........... 208/216, 254, 263, 217, 208/209, 213; 252/470

[56] References Cited
UNITED STATES PATENTS

| | | | |
|---|---|---|---|
| 3,340,180 | 9/1967 | Beuther et al. | 208/216 |
| 3,764,565 | 10/1973 | Jacobs et al. | 252/470 |
| 3,848,033 | 11/1974 | Callahan et al. | 252/456 |

Primary Examiner—Delbert E. Gantz
Assistant Examiner—G. J. Crasanakis
Attorney, Agent, or Firm—Herbert D. Knudsen

[57] ABSTRACT

Catalysts having a substantially spherical shape, a void center and a hole in the external surface communicating to the void center, have been found to give superior results in known hydrotreating reactions where sulfur, nitrogen and/or oxygen is removed from a hydrocarbon feed stock.

9 Claims, 1 Drawing Figure

U.S. Patent    May 18, 1976    3,957,627
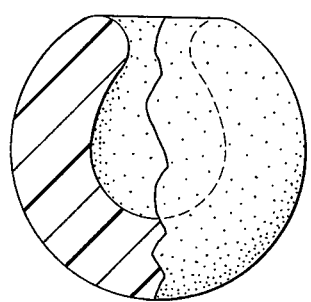

HYDROTREATING HYDROCARBON FEEDS USING AMPHORA-SHAPED CATALYSTS

BACKGROUND OF THE INVENTION

The hydrotreating of hydrocarbon feed stocks containing carbon-sulfur bonds, carbon-nitrogen bond and/or carbon-oxygen bonds, is well known in the art. See for example G. C. A. Schuit add B. C. Gates, *A.I.Ch.E.J.* 19 (3), 419 (1973); S. C. Schuman and H. Shalit, *Catal. Rev.* 4 (2), 245 (1970). As can be seen from the art, these reactions normally involve the use of catalysts consisting of support material impregnated with various catalytically active ingredients. Alternatively, the active ingredients and support are prepared together.

Various shapes and techniques have been used in hydrotreating, see U.S. Pat. No. 3,764,565 which shows the use of various shapes in hydrocracking and hydrotreating reactions.

Callahan, Miller and Shaw, in U.S. Pat. No. 3,848,033 show the preparation of specially shaped particles that are called amphora. Amphora shaped aggregates are substantially spherical aggregates having a void center and a hole in the external surface of the aggregate communicating to the void center.

SUMMARY OF THE INVENTION

The invention is in the process of hydrotreating a hydrocarbon feed stock containing compounds with carbon-sulfur bonds, carbon-nitrogen bonds and/or carbon-oxygen bonds by contacting the hydrocarbon feed stock with hydrogen at an elevated temperature in the presence of a catalyst to remove sulfur, nitrogen and/or oxygen from the hydrocarbon feed stock, the improvement comprising using as at least part of the catalyst an amphora catalyst having a substantially spherical shape, a void center and a hole in the external surface of catalyst communicating to the void center.

These catalysts are referred to as "amphora" shaped catalysts and provide superior results iin hydrotreating reactions as compared to catalyst shapes that are normally employed in hydrotreating reactions such as spheres or extrudates.

The central feature of the invention is the use of catalysts having the amphora shape. This amphora shape is shown in greater detail in the accompanying drawing.

DESCRIPTION OF THE DRAWING

The amphora shaped catalyst of the invention is seen in the drawing. From the outward appearance, the catalyst appears to be a sphere. In the external surface, however, there is a hole that communicates to a void center. Accordingly, the total external surface of the amphora is substantially larger than that of a sphere.

DETAILED DESCRIPTION OF THE INVENTION

As noted in the Background of the Invention above, the hydrotreating proess of the invention is well known in the art. The present invention is the use of a different shaped catalyst in this known reaction which results in an enhancement of catalyst activity.

The amphora shape of the catalyst can be obtained by the methods shown by Callahan, Miller and Shaw in U.S. Pat. No. 3,848,033. Broadly, this method involves the preparation of a slurry from the catalyst support material alone or the support material plus the active catalytic ingredients. The slurry is then formed into droplets and dropped into a particle bed made of small particles of a solid. This particle bed is preferably static; and for the best results the droplet is not completely covered by the particles of the particle bed. The bed serves to catch and cushion the slurry droplets, and it is not intended that any of the bed material should become incorporated in the amphora catalyst.

For the preferred alumina supported catalysts, a slurry is prepared from the alumina and the slurry is used in the procdure described above. Satisfactory bed materials for the above slurries include finely ground active carbon, finely divided alumina, powdered Teflon, fluorocarbon powder or mixtures of these materials.

When the droplet contacts the particle bed, it is, of course, spherical. Broadly, the nature of the particle bed or the conditions of the particle bed, including heat or other source of drying are adjusted so that most, but not all, of the external surface becomes set, i.e. the suspending liquid of the slurry is removed. The suspended particles in the slurry then migate to this set outer surface, and a void center is formed. In a similar manner, the portion of the external surface of the spherical droplet that was not originally dried migrates to the interior of the droplet. This migration "pulls" a hole from the external surface of the droplet to the void center.

In an example, the amphora formed in the specific embodiments used an alumina slurry and a finely divided active carbon bed. The aqueous alumina slurry was dropped into the heated active carbon bed so that about the top one-third of the droplet was not covered by the active carbon. Partly due to the heat and partly due to the capillary action of the active carbon, the water from the external surface of the droplet in contact with active carbon is removed. A mild flow of air over the surface of the bed and an overhead heat lamp enhance the drying rate of the exposed portion of the slurry droplet. The amphora shape develops in the manner previously described.

This amphora shape can be obtained using a wide range of slurries and particle beds. A hydrophobic or hydrophilic particle bed can be employed to prepare the amphora. The specific techniques may vary to some extent as different slurries and particle beds are employed, but the amphora shape is believed to form in each case as described above. The amphora made by this process may have any size, but amphora having a diameter of 1.5 to about 4.0 mm. are normally used.

As noted, the active catalytic ingredients in the amphora can be impregnated into the amphora-shaped support material or incorporated into the slurry. Any catalytic ingredients and support materials used in hydrotreating reactions may be used in the invention. Preferred are support materials containing high surface area alumina and active ingredients containing elements of Group VIB and/or Group VIII of the Periodic Table.

The amount of amphora shaped catalyst in the catalyst of the reaction, of course, can be varied from as low as a few percent of the total catalyst, e.g. 10% of the total catalyst by weight, to essentially all of the catalyst. Preferred are catalysts that use more than 20% by weight of amphora, with catalysts using more than 50% by weight being especially preferred.

Because of their spherical shape, amphora catalysts can be readily packed into a fixed-bed reactor without problems of bridging. Further, during operation, the amphora provides a low pressure drop and a high external surface to catalyst volume ratio. In addition, the high external surface should provide extended catalyst life for those reactions involving surface deactivation of the catalyst through coking or metals deposition.

The hydrotreating process in which the amphora catalyst is employed is well known. Such reactions are employed primarily in the refining of crude oil and its fractions into products. In hydrotreating reactions of the invention, the hydrocarbon feed is contacted with hydrogen at an elevated temperature and pressure in the presence of the amphora catalyst. In the hydrotreating process carbon-sulfur bonds, carbon-nitrogen bonds and/or carbon-oxygen bonds are broken in such a manner that the sulfur, nitrogen or oxygen is removed from the hydrocarbon in the form of $H_2S$, $NH_3$, and $H_2O$. Although the primary use of the hydrotreating is with crude oil and its fractions, hydrotreating can also be used on liquid products derived from coal, tar sands or oil shale.

The hydrotreating reaction of the invention is suitably carried out at a temperature of about 200° to about 600°C., with temperatures of about 300°to 425°C. being preferred. The hydrotreating reactions can be carried out in the vapor phase of liquid phase at atmospheric or preferably superatmospheric pressure. The reactant feed contains the hydrocarbon and hydrogen in essentially any ratio desired. Hydrotreating is normally conducted in a fixed-bed reactor using superatomospheric pressure in the range of 100–10,000 p.s.i.g., preferably 200–3000 p.s.i.g.

Using amphora in the hydrotreating process gives improved conversions, longer catalyst life, better temperature control and many other advantages that are in part brought out by the examples given below.

SPECIFIC EMBODIMENTS

COMPARATIVE EXAMPLES A–H AND EXAMPLES 1–8

Comparison of amphora shape with a spherical shape in the hydrodesulfurization of thiophene.

To compare the effect of the amphora shape with a known catalyst shape, two catalysts were prepared having substantially identical properties except that one was of the amphora shape and the other had a spherical shape. The catalyst supports were prepared as follows:

Amphora Preparation

In 80 ml. of water, 0.6 g. of a water-soluble nonionic organic polymer was dissolved and 40 g. of $Al(NO_3)_3.9H_2O$ was added with vigorous stirring until all of the aluminum nitrate had dissolved. To this solution, 200 g. of alumina trihydrate was added, and the mixture was blended in a blender until a creamy homogeneous slurry was obtained. This slurry was aged overnight. The aged slurry was dropped through a pipette in droplets onto a bed of finely divided active carbon which had been preheated with a heat lamp. The drop height was adjusted to allow the droplets to be one-half to three-fourths embedded into the active carbon. After the slurry was dropped, the droplets still in the active carbon bed, were heated for 2–3 minutes under a heat lamp with a mild flow of air over the surface of the bed. The carbon bed was then screened off, and the 4 mm. diameter amphora shaped particles were heated at 110°C. overnight and then calcined for 2 hours at 425°C.

Sphere Preparation

The spherical catalysts were prepared in substantially the same manner as shown above except that the nonionic organic polymer was omitted and the slurry droplets were dropped into a bed of finely divided Alundum at room temperature. There was no heating of the Alundum bed, and the mild air flow was also omitted. The resulting 4 mm. diameter spheres were heat treated as described above.

Impregnation

Two identical solutions were prepared for the impregnation. Each solution was prepared by dissolving 8.1 g. of $(NH_4)_6Mo_7O_{24}.4H_2O$ in 20 ml. of 28% $NH_3$ solution. To this solution was slowly added 7.67 g. $Co(NO_3)_2.6H_2O$ which had been dissolved in 2 ml. of hot water. To dissolve the precipitate formed, 10 ml. of concentrated $NH_3$ solution was added. A 56.4 g. sample of the catalyst support was titrated to incipient wetness with the above solution and the resulting solid was dried overnight at 110°C., and calcined for two hours at 425°C. The properties of the resulting catalysts are shown below:

Table 1

| | Properties of Catalysts | |
|---|---|---|
| | Amphora | Spherical |
| Composition, wt. % | | |
| CoO | 3.1 | 3.2 |
| $MoO_3$ | 14.2 | 13.0 |
| Bulk Density (g./cc.) | 0.67 | 0.78 |
| Pore Volume (cc./g.) | 0.44 | 0.36 |
| Surface Area (m.²/g.) | 161 | 175 |

Hydrodesulfurization of Thiophene

In a 5 cc. reaction zone of a stainless steel reactor constructed of a 1 cm. inside diameter tube, comparative tests were run on the hydrodesulfurization of thiophene at atmospheric pressure. Hydrogen was saturated with thiophene and passed through the reaction zone containing the catalyst. Table 2 shows the results of these tests comparing the amphora with the spherical catalyst. The thiophene-hydrogen mixture was fed through the reaction zone over the range of temperatures and liquid hourly space velocities (LHSV) shown in the table. The results are shown in terms of the amount of thiophene desulfurized. The results were obtained by analyzing measured samples of reactor feed and effluent by gas-liquid chromatography. Comparative Examples A-H are represented by the data in the column headed "Spherical" and Examples 1–8 of the invention are represented by the column headed "Amphora."

Table 2

Comparison of Amphora with Spherical Shaped Catalyst in the Hydrodesulfurization of Thiophene

| | Conditions | | Thiophene Converted, % | |
|---|---|---|---|---|
| Comparison | Temp., °C. | LHSV,hr-1 | Amphora | Spherical |
| 1 | 260 | 0.25 | 10.0 | 9.7 |
| 2 | 316 | " | 27.3 | 26.0 |
| 3 | 371 | 2.0 | 14.0 | 11.6 |
| 4 | " | 1.0 | 21.6 | 17.8 |
| 5 | " | 0.5 | 36.5 | 29.9 |
| 6 | " | 0.25 | 56.4 | 44.4 |
| 7 | " | 0.20 | 68.5 | 57.9 |

Table 2-continued

Comparison of Amphora with Spherical Shaped Catalyst in the Hydrodesulfurization of Thiophene

| Comparison | Conditions Temp., °C. | LHSV, hr-1 | Thiophene Converted, % Amphora | Spherical |
|---|---|---|---|---|
| 8 | 454 | 0.25 | 78.3 | 64.4 |

COMPARATIVE EXAMPLES I-P AND EXAMPLES 9-16

Comparison of amphora with spherical catalyst in hydrodesulfurization of heavy gas oil.

In a 50 cc., 15 cm. long reaction zone of a fixed-bed reactor, a comparison of the amphora shape with spherical shaped catalyst was conducted using a heavy gas oil. The feed was cat cracked heavy gas oil having a boiling range of 191° to 427°C. and a sulfur content of 1.14%. The feed was processed at a total pressure of 500 p.s.i.g., and the hydrogen-to-feed ratio was 3500 standard cubic feet of hydrogen/barrel of gas oil. The amphora and spherical catalyst were taken from the batches prepared above. The reaction zone of 50 cc. used 33.3 g. of amphora and 38.9 g. of the spherical catalyst. Even though less of the amphora by weight was used, the sulfur removal using the amphora was better (except the experiment at 399°C.) than the spherical catalyst as shown in Table 3. The data are given for substantially equal times on stream which ranged from 1.5 to 17.4 hours.

Table 3

Comparison of Amphora with Spherical Shaped Catalysts in the Hydrodesulfurization of Cat Cracked Heavy Gas Oil Containing 1.14% Sulfur

| Comparison | Conditions Temp.,°C. | LHSV | Sulfur Removal, % Amphora | Spherical |
|---|---|---|---|---|
| 9 | 316 | 2.0 | 46.4 | 41.4 |
| 10 | " | 4.0 | 32.3 | 31.5 |
| 11 | 343 | 2.0 | 54.3 | 50.8 |
| 12 | 371 | 1.0 | 80.7 | 78.0 |
| 13 | " | 2.0 | 75.4 | 68.4 |
| 14 | " | 3.0 | 64.0 | 61.3 |
| 15 | " | 4.0 | 56.1 | 53.4 |
| 16 | 399 | 2.0 | 81.5 | 81.5 |

COMPARATIVVE EXAMPLES Q-U AND EXAMPLES 17-21

Comparison of amphora with extrudates in the vapor phase hydrodesulfurization of straight run distillate.

Catalysts of identical composition containing 3 wt. % CoO and 15 wt. % MoO$_3$ on gamma alumina were used in the hydrodesulfurization of straight run kerosine having a boiling range of 193-263°C. and containing 0.29 weight percent sulfur. The amphora catalyst was prepared by impregnation of the alumina as described above except that the amphora had a 2.3 mm. diameter. The extrudates had a 3.1 mm. average diameter and an average length of 7 mm. The hydrodesulfurization was run in the 50 cc. reactor described above at a temperature of 316°C. and a total pressure of 300 p.s.i.g., with a 230 p.s.i.g. H$_2$ partial pressure. The hydrogen-to-feed ratio was 1080 standard cubic feet of hydrogen per barrel of feed and liquid hourly space velocities of 2.0–6.0 reciprocal hours were employed.

The results of these experiments are shown in Table 4.

Table 4

Comparison of Amphora with Extrudate in the Hydrodesulfurization of Straight Run Kerosine at 316°C.

| Comparison | LHSV, hr-1 | Sulfur Removal, % Amphora | Extrudate |
|---|---|---|---|
| 17 | 2 | 94.1 | 92.0 |
| 18 | 3 | 96.9 | 88.6 |
| 19 | 4 | 94.1 | 83.0 |
| 20 | 5 | 92.8 | 78.2 |
| 21 | 6 | 88.9 | 73.1 |

COMPARATIVE EXAMPLES V-Y AND EXAMPLES 22-25

Hydrotreating a vacuum gas oil for both sulfur and nitrogen removal.

An amphora catalyst support and an extrudate catalyst support of γ-alumina were impregnated to obtain catalysts having 3 wt. % NiO and 15% MoO$_3$. These catalysts were compared in the hydrotreating of vacuum gas oil that was obtained from a crude blend having approximately 80% light Iranian crude. The vacuum gas oil had a boiling point of 204°-549°C. and contained 1.42 weight % sulfur and 1100 p.p.m. of nitrogen. The experiments were conducted at a temperature of 371°C. using 500 p.s.i.g. total pressure and a hydrogen:feed ratio of 3500 standard cubic feet of hydrogen per barrel of feed. The results of these experiments are shown in Table 5.

Table 5

Hydrotreating to Remove Sulfur and Nitrogen From Vacuum Gas Oil at 371°C.

| Comparison | LHSV, hr.-1 | Results, % Sulfur Removal Amphora | Extrudate | Nitrogen Removal Amphora | Extrudate |
|---|---|---|---|---|---|
| 22 and 23 | 2.0 | 75.4 | 71.9 | 21.0 | 19.3 |
| 24 and 25 | 3.0 | 67.1 | 64.0 | 20.9 | 19.2 |

In the same manner as described above, the amphora form of catalysts can be compared to other commercial forms of catalyst to show very favorable results. Also in the same manner as described above, other catalysts are prepared containing different active components to remove sulfur, nitrogen and oxygen in hydrocarbon feeds.

An oil shale fraction with an unacceptably high concentration of oxygenated products is hydrotreated with amphora shaped catalyst to yield an acceptable oil shale fraction.

We claim:

1. In the process of hydrotreating a hydrocarbon feed stock containing compounds with carbon-sulfur bonds, carbon-nitrogen bonds and carbon-oxygen bonds by contacting the hydrocarbon feed stock with hydrogen at an elevated temperature and with a hydrotreating catalyst to remove sulfur, nitrogen and oxygen from the hydrocarbon feed stock, the improvement comprising, using as at least part of said catalyst an amphora catalyst having a substantially spherical shape, a void center therein and an opening on the external surface of said catalyst communicating with said void center.

2. The process of claim 1 wherein the amphora catalyst is an alumina based catalyst.

3. The process of claim 1 wherein the amphora catalyst contains at leastt one compound of the elements selected from the group consisting of Group VIB and Group VIII of the Periodic Table.

4. The process of claim 1 wherein sulfur is removed.

5. The process of claim 1 wherein nitrogen is removed.

6. The process of claim 1 wherein oxygen is removed.

7. The process of claim 1 wherein the catalyst employed in said contacting comprises at least 20% by weight of said amphora catalyst.

8. The process of claim 1 wherein the catalyst employed in said contacting comprises at least 50% by weight of said amphora catalyst.

9. The process of claim 1 wherein substantially all of said catalyst in said contacting comprises said amphora catalyst.

* * * * *